United States Patent [19]

Bowen

[11] Patent Number: 4,468,737
[45] Date of Patent: Aug. 28, 1984

[54] CIRCUIT FOR EXTENDING A MULTIPLEXED ADDRESS AND DATA BUS TO DISTANT PERIPHERAL DEVICES

[75] Inventor: Ted R. Bowen, Palatine, Ill.

[73] Assignee: GTE Automatic Electric Inc., Northlake, Ill.

[21] Appl. No.: 386,497

[22] Filed: Jun. 9, 1982

[51] Int. Cl.³ .............................................. H04J 3/06
[52] U.S. Cl. ................................................... 364/200
[58] Field of Search ............... 370/56, 58, 100, 110.1; 364/200, 900

[56] References Cited

U.S. PATENT DOCUMENTS

| | | | |
|---|---|---|---|
| 3,886,317 | 5/1975 | Drapkin | 370/110.1 |
| 3,928,727 | 12/1975 | Roche | 370/100 |
| 3,941,930 | 5/1976 | Mohri et al. | 370/100 |
| 3,963,869 | 6/1976 | Caldwell | 370/100 |
| 3,967,060 | 6/1976 | Subramanian | 370/100 |
| 3,987,250 | 10/1976 | Barbier et al. | 370/100 |
| 3,997,728 | 12/1970 | Duquesne et al. | 370/110.1 |
| 4,055,728 | 10/1977 | Lyon-Caen et al. | 370/58 |
| 4,132,866 | 1/1979 | Coutard et al. | 370/56 |

OTHER PUBLICATIONS

"Microelectronics", Millman, p. 213, 1979, McGraw-Hill Inc.

Primary Examiner—Felix D. Gruber
Assistant Examiner—Tim A. Wiens
Attorney, Agent, or Firm—Frank J. Bogacz; Robert J. Black

[57] ABSTRACT

This circuit provides for extending a multiplexed address and data bus to remotely located computer peripheral devices. The present circuit eliminates skew of transmitted signals between microcomputers and their associated peripheral devices for lengths of up to one hundred feet. This circuit regenerates the bus timing for the peripheral device to accommodate the skew introduced by the length of cable and its associated drivers and receivers.

8 Claims, 4 Drawing Figures

CIRCUIT FOR EXTENDING A MULTIPLEXED ADDRESS AND DATA BUS TO DISTANT PERIPHERAL DEVICES

BACKGROUND OF THE INVENTION

The present invention pertains to data transmission between a microprocessor and peripheral devices and more particularly to the elimination of timing skew in a multiplexed address and data bus between a microprocessor and remotely located peripheral devices.

Several current microprocessors, including the Intel 8086 for example, incorporate a multiplexed address and data bus to reduce the number of terminal pins required for the integrated circuit. Typically, this bus is de-multiplexed locally and the address and data buses are sent separately to the peripheral devices. A considerable savings in signal leads can be realized in large telephone systems by extending these multiplexed buses directly to the remotely located peripheral devices. Several additional control leads are required at the remote location of the peripheral device to de-multiplex this bus, but 36 signal leads can be saved in a 16-bit system, for example.

Cables to connect the microprocessor to the peripheral devices can range in length up to one hundred feet long. Signals propogating along a one hundred foot length of cable tend to become skewed, that is they arrive at their destination at different times. This skew cannot be tolerated by the high speed microprocessors such as the Intel 8086.

Conventional approaches add many wait states in the microprocessor cycle to accommodate this propagation delay. This means the microprocessor is locked onto or awaiting the transmission from the peripheral device. This is an undesirable situation since valuable processor real-time is lost.

Accordingly, it is the object of the present invention to provide for the transmission of a multiplexed address and data bus to remotely located peripheral devices in an efficient real-time manner.

It is a further object of the present invention to provide functions mentioned above in a cost effective manner.

It is another object of the present invention to provide a circuit which is small in the number of different types of components employed.

It is a yet another object of the present invention to provide a circuit which is expandable for longer cabling lengths.

SUMMARY OF THE INVENTION

This circuit extends a multiplexed address/data bus of a microprocessor central processing unit (CPU) to distant peripheral devices such as teletypewriters, line printers, etc. This circuit provides for retiming the control signals for writing from the CPU to the peripheral device and for reading from the peripheral devices to the CPU.

Reading and writing interface to and from the CPU is accomplished via a processor control bus and a processor address/data bus, which is multiplexed with the address and data. The processor control bus is transmitted via cabling and retiming logic to a peripheral device interface, which controls devices such as printers, teletypewriters and tape drives. The processor address/data bus is also transmitted via cabling to the peripheral devices and is retimed by logic. This multiplexed address/data bus is connected to a multiplexed peripheral device address/data bus which is ultimately de-multiplexed and transmitted to the peripheral devices through the peripheral device interface.

The retiming logic includes an address latch for receiving the multiplexed processor address/data bus. This latch collects all bits comprising the transmitted address to deskew these signals. The data portion of the multiplexed address/data bus is received, stored and forwarded at the proper time to the address indicated by the address portion of the bus. A transceiver device controls this operation. Other latching groups control the retiming of the control signals for reading and writing operations to and from the peripheral devices. A cable length of up to one hundred feet connects the processor buses (address/data bus and control bus) to the peripheral devices. The periodic pulses of the processor clock are transmitted to the latching groups. These latching groups control the operation of retiming the address and data buses. The address to be written or read is transmitted via the processor address/data bus and is held on the peripheral device address/data bus for a predetermined fixed time to allow the address and data to be deskewed and resynchronized, so that the data is transmitted to the correct peripheral device. This holding time is a minimal time on the order of one and one-half processor clock cycles. This minimal holding time prevents the CPU from losing valuable real-time due to the introduction of many wait states because of the great operating time differential between the CPU and the slower peripheral devices.

DESCRIPTION OF THE PREFERRED EMBODIMENT

Figure 1:
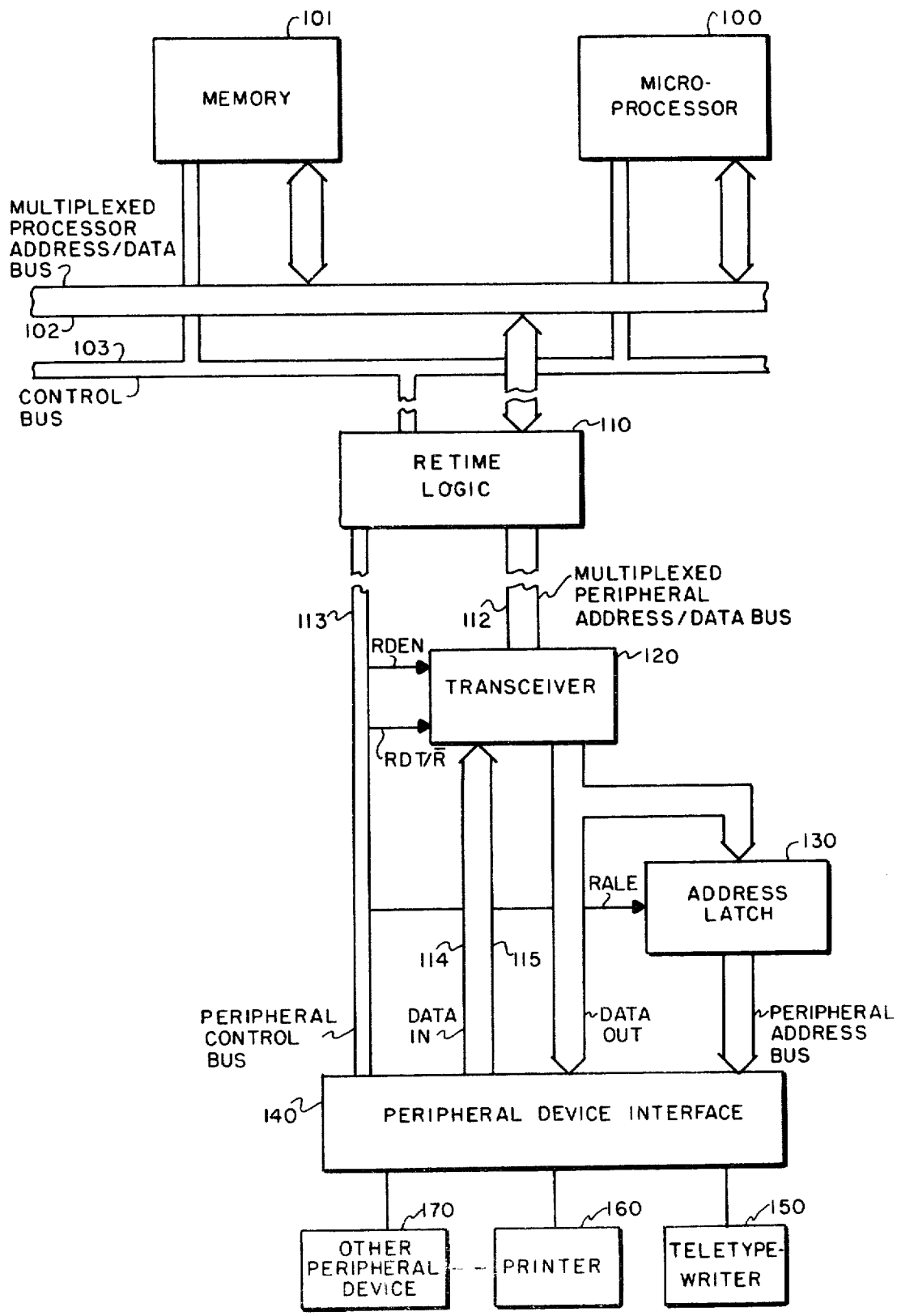
FIG. 1 is a block diagram of the busing arrangement with retiming logic between a central processing unit and distant peripheral devices.

Referring to FIG. 1, a block diagram of the circuitry for extending a multiplexed address/data bus to distant peripherals is shown. Microprocessor (CPU) 100 is connected to local memory 101 via multiplexed processor address/data bus 102 and processor control bus 103. These buses 102 and 103 are extended via cabling to retime logic 110. Peripheral control bus 113 transmits the resynchronized control signals to peripheral device interface 140. The multiplexed peripheral address/data bus 112 is retimed and transmitted via cabling to transceiver 120.

At the appropriate time, signals RDEN and RDT/R cause transceiver 120 to receive the multiplexed bus 112 and to forward it to address latch 130 for de-multiplexing. Signal RALE of peripheral control bus 113 causes address latch 130 to operate to store the address from the multiplexed bus 112. Data in and Data out buses 114 and 115 respectively are directly connected from transceiver 120 to peripheral device interface 140. Peripheral device interface 140 is connected to and operates peripheral devices such as teletypewriter 150, printer 160 or a number of other peripheral devices 170, such as magnetic tape units.

Figure 2:
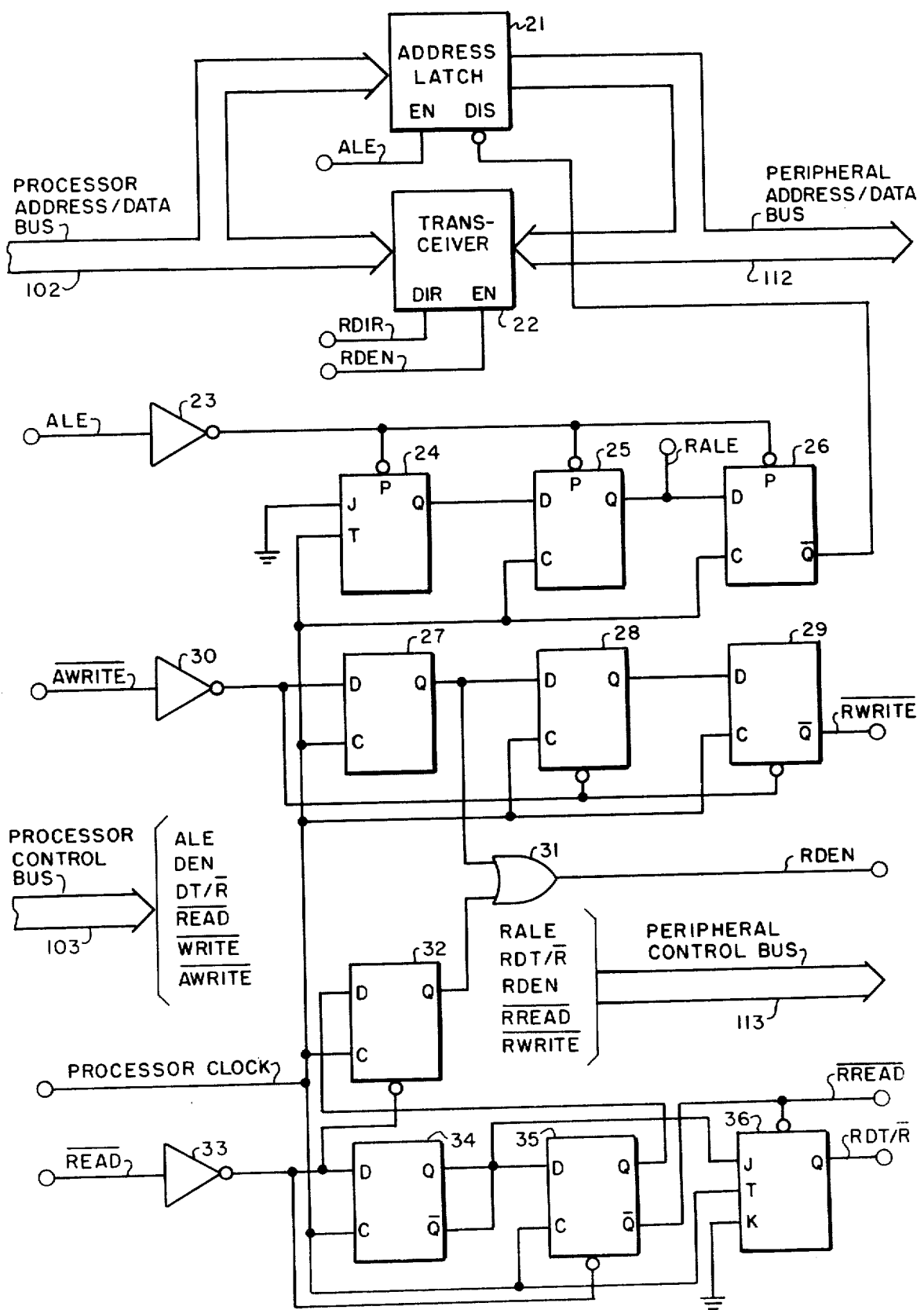
FIG. 2 is a schematic diagram of the retiming logic for deskewing and resynchronizing the address and data buses.
Figure 3:
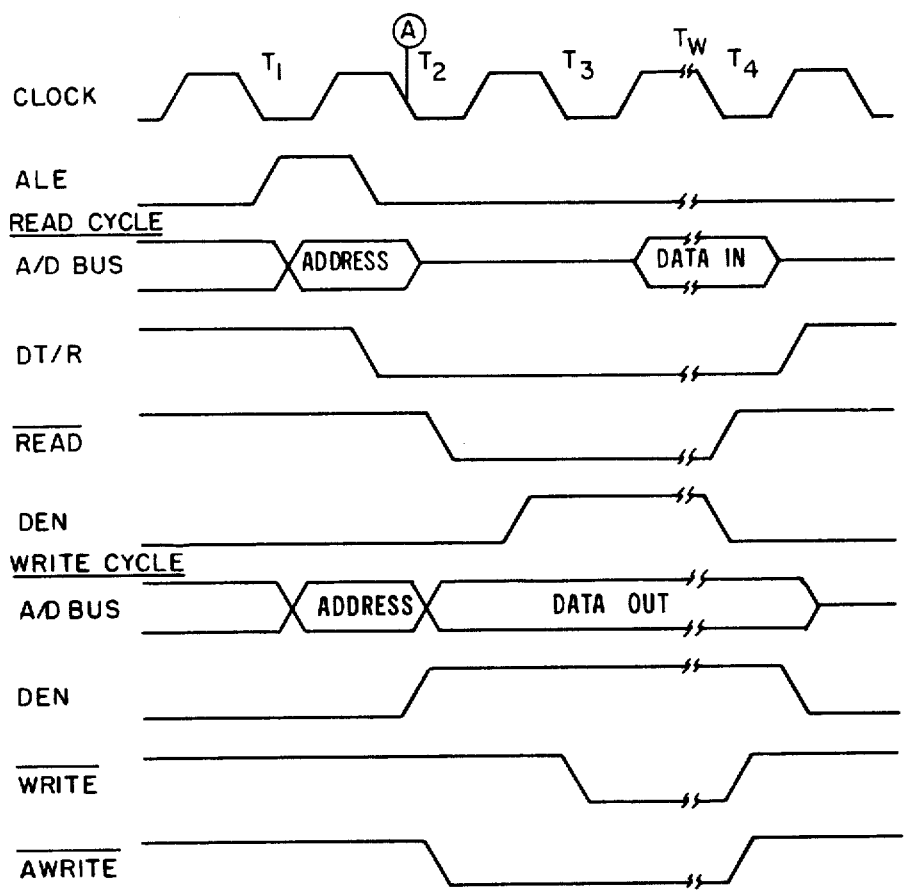
FIG. 3 is a timing diagram of the CPU's address/data bus and control bus signals.
Figure 4:
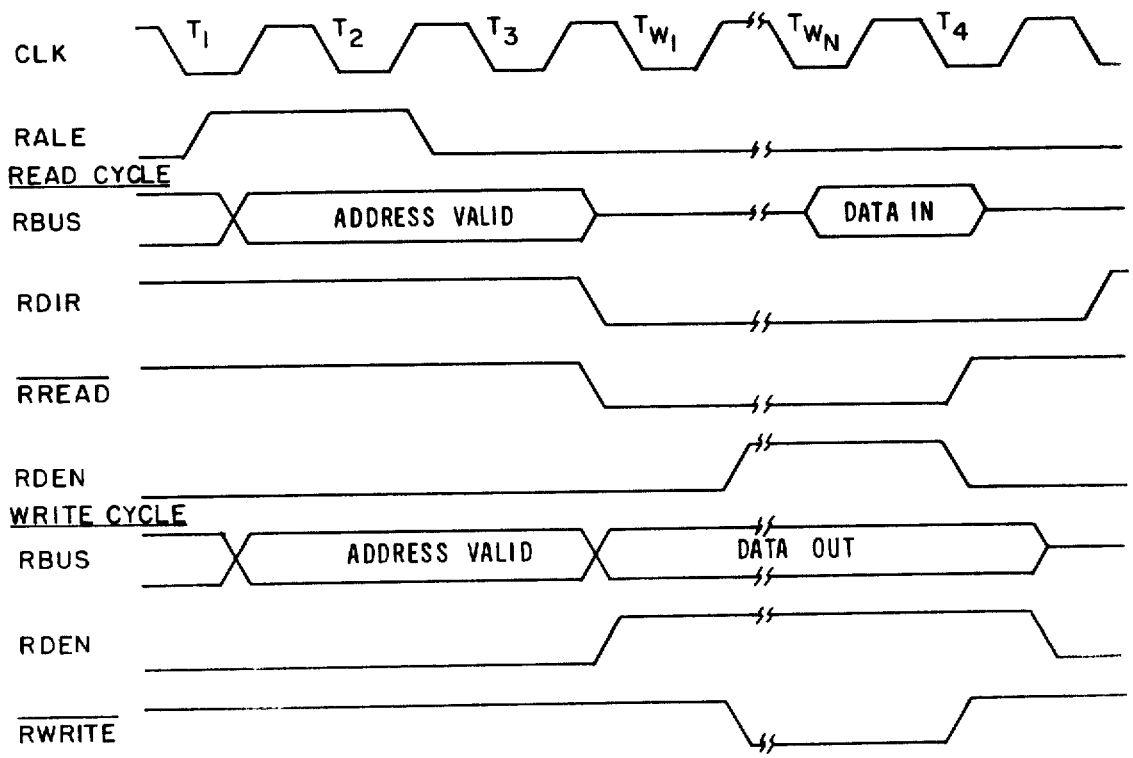
FIG. 4 is a timing diagram of the peripheral device address/data bus and control bus signals which are deskewed and resynchronized.

Referring to FIGS. 2, 3, and 4 taken collectively, FIG. 2 is a schematic diagram of the retiming logic shown as item 110 in FIG. 1. FIG. 3 is a timing diagram of the microprocessor CPU's control timing signals. FIG. 4 depicts the processor control signals which are resynchronized by the retiming logic and transmitted to the distant peripheral devices. Extension of the multiplexed address/data bus 102 in FIG. 2 is accomplished by regenerating the bus timing to accommodate the skew of the connecting cable and its associated cable drivers and receivers. The timing logic shown in FIG. 2 provides for up to one hundred feet of cable. Additional flip-flops or shift registers could be implemented to accommodate longer cable lengths.

Generally, propogation of the processor control bus signals 103 causes the CPU to automatically add wait states TW between states T3 and T4. The CPU will add as many wait states as required by the length of the cable. The present invention introduces a fixed minimum of wait states to avoid real-time loss. The CPU of the present invention may be implemented with an Intel 8086 microprocessor or similar device.

For the following discussion signals prefixed by an R indicate resynchronized signals. The address latch enable ALE signal of the microprocessor sets flip-flops 24, 25, and 26. In addition, ALE enables address latch 21 to receive the address of the processor address/data bus 102. Flip-flop 25 produces the resynchronized address latch enable RALE which is transmitted to the distant peripheral devices. All flip-flops are connected to and synchronized by signals from the processor clock.

Referring to FIG. 3 on the trailing edge of ALE signal, the address of bus 102 is latched by address latch 21 and remains on the peripheral bus 112. Flip-flop 24 resets on the falling edge of clock pulse T2, shown as point A in FIG. 3. As a result flip-flop 25 is enabled to reset on the next rising edge of the clock signal. Further, signal RALE is terminated, as shown in FIG. 4. The trailing edge of RALE will latch the address of peripheral bus 112 in address latch 130, shown in FIG. 1, and also will enable flip-flop 26 to reset on the rising edge of clock pulse T3. At the completion, the address latch 21 is disabled and its tri-state outputs are removed from the address bus 112.

For the read operation, $\overline{\text{RREAD}}$ becomes active on the rising edge of T3, as shown in FIG. 4. The processor bus signal $\overline{\text{READ}}$ shown in FIG. 3 became active on the falling edge of T2 thereby enabling flip-flop 34 via inverter 33 to be set on the rising edge of clock pulse T2. In addition, flip-flop 34 enables flip-flop 35 to be set on the rising edge of clock pulse T3, thereby initiating $\overline{\text{RREAD}}$. Flip-flop 35 causes flip-flop 36 to be set initiating signal RDT/$\overline{\text{R}}$.

In addition, flip-flop 32 is enabled and sets on the rising edge of the first wait state TW. As a result, signal RDEN is initiated via OR gate 31. The peripheral address/data bus 112 floats from the time address latch 21 is disabled until signal RDEN reaches the peripheral transceiver shown as item 130 in FIG. 1. Signal RDEN also enables transceiver 22 to receive data from the peripheral bus 112 and pass it to the processor bus 102.

On the following edge of clock pulse T4, the processor $\overline{\text{READ}}$ signal goes inactive, thereby resetting flip-flop 32 which terminates the RDEN signal and the $\overline{\text{RREAD}}$ signal and also enables flip-flop 34. Flip-flop 34 resets on the rising edge of T4, thereby enabling flip-flop 36 to reset on the next falling edge of the clock signal, terminating RDT/$\overline{\text{R}}$. (The next falling edge is T1 of the next processor cycle.)

For the write operation address/data buses 102 and 112 and signal RALE are handled in the same manner as for the read operation, except that peripheral bus 112 does not float after the address is removed from it. Advanced write pulse $\overline{\text{AWRITE}}$ goes active, instead of $\overline{\text{READ}}$ on the falling edge of clock signal T2. Consequently, flip-flop 27 is reset on the rising edge of clock pulse T3 via inverter 30. This initiates RDEN via OR gate 31 and enables flip-flop 28. Signal RDT/$\overline{\text{R}}$ is now inactive. Signal RDEN enables transceiver 22 to drive the peripheral bus 112 with data output from the microprocessor. (The enable and disable times of the tri-state outputs of address latch 21 and transceiver 22 are designed so that they may be enabled at the same time the other device is disabled without causing contention problems on buses 102 and 112.)

Flip-flop 28 sets on the rising edge of clock pulse T3, thereby enabling flip-flop 29 to be set on the rising edge of the first wait state TW. As a result, signal $\overline{\text{RWRITE}}$ is initiated.

An advanced WRITE pulse $\overline{\text{AWRITE}}$ is not needed by the peripheral devices, so only signal $\overline{\text{RWRITE}}$ is transmitted. Signal $\overline{\text{AWRITE}}$ becomes inactive on the falling edge of T4, thereby clearing flip-flops 28 and 29 and terminating signal $\overline{\text{RWRITE}}$. Flip-flop 27 is also reset on the rising edge of clock signal T4, thereby terminating signal RDEN and completing the write cycle.

Signals DEN and DT/$\overline{\text{R}}$, which are generated by the microprocessor, will occur within 19 nanoseconds of each other in the worse case. The skew of cable drivers and cable receivers is greater than this time thereby creating the possibility that direction of data travel could change while the DEN signal is still active. This would cause the peripheral transceiver 130 of FIG. 1 to switch directions while its outputs are enabled producing unwanted spikes on the peripheral bus 112. By allowing a full processor clock cycle between DEN and DT/$\overline{\text{R}}$, any premature bus reversals are prevented.

It should be noted that this circuitry is compatible with both the 5 MHZ. and 8 MHZ. versions of the Intel 8086 microprocessor. Address latch 21 may be implemented with an integrated circuit part no. 74LS373. Transceiver 22 may be implemented with an integrated circuit part no. 74LS245. JK flip-flops (24 and 36) and D-type flip-flops (25–29, 32, 34 and 35) may be implemented with integrated circuit part nos. 74LS112A and 74LS74A respectively. All inverters shown may be implemented with integrated circuit part no. 74LS04. OR gates shown may be implemented with integrated circuit part no. 74LS32.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A circuit for extending a multiplexed address/data bus of a central processor to distant co-located peripheral devices for writing to said peripheral devices, said circuit comprising:
   CPU means;

a processor clock for producing periodic pulses and being connected to said CPU means;

a processor control bus connected to said CPU means;

a multiplexed peripheral device address/data bus being connected to said peripheral devices;

a peripheral device control bus being connected to said peripheral devices;

an address latch connected between said multiplexed address/data bus and said multiplexed peripheral device address/data bus, said address latch operated to receive an address transmitted on said multiplexed address/data bus;

means for receiving, storing and forwarding connected between said multiplexed address/data bus and said peripheral device address/data bus, said means for receiving, storing and forwarding being operated to transfer data bi-directionally between said CPU means and said peripheral devices via said multiplexed peripheral device address/data bus and said multiplexed address/data bus;

first latching means connected to said processor control bus, to said peripheral device control bus and to said address latch, said first latching means being operated in response to a first control signal of said CPU means to delay said first control signal for a predetermined time for deskewing said address of said multiplexed address/data bus;

second latching means connected to said processor control bus to said peripheral device control bus and to said means for receiving, storing and forwarding, said second latching means being operated to delay a second control signal of said CPU means a predetermined time for transmission to said peripheral devices, said second latching means being further operated to control said means for receiving, storing and forwarding by generating a third signal;

said connection between said first and second latching means and said processor control bus including a cable of substantial physical length; and said first and second latching means connected to said processor clock and being operated in response to said periodic pulses to delay said first and second control signals a minimally sufficient time for resynchronization and retransmission to said peripheral devices.

2. A circuit for extending a multiplexed address/data bus of a central processor to distant co-located peripheral devices for reading from said peripheral devices, said circuit comprising:

CPU means;

a processor control bus being connected to said CPU means;

a processor clock for producing periodic pulses and being connected to said CPU means;

a multiplexed peripheral device address/data bus being connected to said peripheral devices;

a peripheral device control bus being connected to said peripheral devices;

an address latch connected between said multiplexed address/data bus and said multiplexed peripheral device address/data bus, said address latch being operated to receive an address on said multiplexed address/data bus;

means for receiving, storing and forwarding connected between said multiplexed peripheral device address/data bus and said multiplexed address/data bus, said means for receiving, storing and forwarding being operated to bi-directionally transmit data from said peripheral devices to said CPU means via said multiplexed peripheral device address/data bus and said multiplexed address/data bus;

first latching means connected to said processor control bus, said peripheral device control bus and to said address latch, said first latching means being operated in response to a first control signal of said CPU means to delay said first control signal a predetermined time for deskewing said address of said multiplexed address/data bus;

second latching means connected to said processor control bus, to said peripheral device control bus and to said means for receiving, storing and forwarding, said second latching means being operated in response to a second control signal of said processor control bus to control operation of said means for receiving, storing and forwarding by generating a third control signal and to generate a fourth and a fifth control signal for transmission to said peripheral devices;

said connection between said first and second latching means and said CPU means via said processor control bus including a cable of substantial physical length; and said first and second latching means connected to said processor clock and being operated in response to said periodic pulses to delay said first and second control signals transmitted via said cable a minimally sufficient time for resynchronization and retransmission to said peripheral devices.

3. A circuit as claimed in claim 1, said second latching means including:

at least three D-type flip-flops having input and output connections, said flip-flops connected to said processor clock, said flip-flops further connected in a serial array, said input connection of one is connected to said output connection of said next serial flip-flop for delaying said second control signal.

4. A circuit as claimed in claim 1, said first latching means including:

a J-K flip-flop having input and output connections;

a first D-type flip-flop having input and output connections, said input connection connected to said output connection of said J-K flip-flop and said D-type flip-flop providing for said first control signal via said output connection;

a second D-type flip-flop having input and output connections, said input connection connected to said output connector of said first D-type flip-flop and said output connection connected to said address latch; and said processor clock connected to each of said flip-flops for sequencing said first control signal through each of said flip-flops.

5. A circuit as claimed in claim 2, said first latching means including:

a J-K flip-flop having input and output connections;

a first D-type flip-flop having input and output connections, said input connection connected to said output connection of said J-K flip-flop and said D-type flip-flop providing for said first control signal via said output connection;

a second D-type flip-flop having input and output connections, said input connection connected to said output connector of said first D-type flip-flop and said output connection connected to said address latch; and said processor clock connected to each of said flip-flops for sequencing said first control signal through each of said flip-flops.

6. A circuit as claimed in claim 2, said second latching means including:
- at least two D-type flip-flops having input and output connections connected to said processor clock, said flip-flops connected in a serial array, said input connection of one connected to said output of said next serial flip-flop for delaying said fourth control signal;
- a J-K type flip-flop connected to said last serial flip-flop for producing a fifth control signal; and said processor clock further connected to said J-K type flip-flop.

7. A circuit as claimed in claim 3, said second latching means further including an OR gate connected between said one D-type flip-flop of said second latching means and said means for receiving, storing and forwarding for producing said third control signal to enable said means for receiving, storing and forwarding.

8. A circuit as claimed in claim 6, said second latching means further including an OR gate connected between said one D-type flip-flop of said second latching means and said means for receiving, storing and forwarding for producing said third control signal to enable said means for receiving, storing and forwarding.

* * * * *